(12) United States Patent
Hallundbæk

(10) Patent No.: US 9,444,259 B2
(45) Date of Patent: Sep. 13, 2016

(54) SAFETY DEVICE

(75) Inventor: Jørgen Hallundbæk, Graested (DK)

(73) Assignee: WELLTEC A/S, Allerød (DK)

( * ) Notice: Subject to any disclaimer, the term of this patent is extended or adjusted under 35 U.S.C. 154(b) by 661 days.

(21) Appl. No.: 13/807,810

(22) PCT Filed: Jun. 30, 2011

(86) PCT No.: PCT/EP2011/061031
§ 371 (c)(1),
(2), (4) Date: Dec. 31, 2012

(87) PCT Pub. No.: WO2012/001116
PCT Pub. Date: Jan. 5, 2012

(65) Prior Publication Data
US 2013/0093260 A1    Apr. 18, 2013

(30) Foreign Application Priority Data

Jun. 30, 2010  (EP) .................................. 10167944

(51) Int. Cl.
| H02J 4/00 | (2006.01) |
| E21B 41/00 | (2006.01) |
| E21B 43/1185 | (2006.01) |
| H01H 1/16 | (2006.01) |
| H01H 19/18 | (2006.01) |
| H01R 39/64 | (2006.01) |

(52) U.S. Cl.
CPC .................. *H02J 4/00* (2013.01); *E21B 41/00* (2013.01); *E21B 43/1185* (2013.01); *H01H 1/16* (2013.01); *H01H 19/186* (2013.01); *H01R 39/64* (2013.01); *Y10T 307/826* (2015.04)

(58) Field of Classification Search
USPC ......................................................... 307/150
See application file for complete search history.

(56) References Cited

U.S. PATENT DOCUMENTS

| 2,441,894 A * | 5/1948 | Mennecier .......... E21B 33/1243 |
| | | 137/68.13 |
| 6,319,073 B1 * | 11/2001 | Menolotto ........... G02B 6/3816 |
| | | 439/744 |
| 6,481,495 B1 * | 11/2002 | Evans ................... E21B 17/003 |
| | | 166/178 |
| 6,525,265 B1 | 2/2003 | Leijon et al. |
| 2005/0070141 A1 | 3/2005 | Dopf et al. |
| 2012/0313741 A1 * | 12/2012 | Hall ........................ H01F 38/14 |
| | | 336/118 |

FOREIGN PATENT DOCUMENTS

| CN | 1279829 A | 1/2001 |
| GB | 2 222 032 | 2/1990 |
| RU | 2 330 939 | 8/2010 |

OTHER PUBLICATIONS

International Preliminary Report on Patentability for PCT/EP2011/061031, issued Jan. 8, 2013 6 pages.
(Continued)

*Primary Examiner* — Rexford Barnie
*Assistant Examiner* — Xuan Ly
(74) *Attorney, Agent, or Firm* — Nixon & Vanderhye P.C.

(57) ABSTRACT

The present invention relates to a downhole safety device (1) for a downhole tool (2) for controlling a delivery of electricity from a power device to an electrical component in the tool, comprising a first member (3) comprising a plurality of conductors (4) and a second member (6) comprising a plurality of conductors (7). Furthermore, the invention relates to a method for activating the safety device.

14 Claims, 5 Drawing Sheets

(56) References Cited

OTHER PUBLICATIONS

Chinese Office Action mailed Dec. 3, 2014 in Chinese Application No. 201180031960.9, with English translation (12 pages).

International Search Report for PCT/EP2011/061031 mailed Jul. 27, 2011.
Written Opinion for PCT/EP2011/061031 mailed Jul. 27, 2011.

* cited by examiner

SAFETY DEVICE

This application is the U.S. national phase of International Application No. PCT/EP2011/061031 filed 30 Jun. 2011 which designated the U.S. and claims priority to EP 10167944.7 filed 30 Jun. 2010, the entire contents of each of which are hereby incorporated by reference.

TECHNICAL FIELD

The present invention relates to a downhole safety device for a downhole tool for controlling a delivery of electricity from a power device to an electrical component in the tool, comprising a first member comprising a plurality of conductors, and a second member comprising a plurality of conductors. Furthermore, the invention relates to a method for activating the safety device.

BACKGROUND

When an electronic component, such as a relay, in a tool breaks down, there is a risk that too much electrical power is transferred to the other components in the tool. Many electrical components can withstand receiving too much power, and electrical systems are often designed to turn off the power in cases like this.

However, when working downhole, communication to and from the tool as well as communication within the tool can be difficult. Higher security is especially important in tools handling drilling units, explosives or cement to ensure that they do not perform uncontrolled operations, such as explosives not being detonated, drilling tools drilling in an uncontrolled direction or cement being ejected unintentionally, thereby closing the well.

DESCRIPTION OF THE INVENTION

It is an object of the present invention to wholly or partly overcome the above disadvantages and drawbacks of the prior art. More specifically, it is an object to provide a safety device for a downhole tool securing that operations are not performed unintentionally so that e.g. a perforation switch is not activated if there is a failure in the tool.

The above objects, together with numerous other objects, advantages, and features, which will become evident from the below description, are accomplished by a solution in accordance with the present invention by a downhole safety device for a downhole tool for controlling a delivery of electricity from a power device to an electrical component in the tool, comprising:
- a first member comprising a plurality of conductors, and
- a second member comprising a plurality of conductors, and
- a moving device for moving the first member in relation to the second member, wherein the conductors of the first member are first and second conductors, and at least two of the first conductors have a greater surface area than the second conductors, enabling the first conductors to transfer more power to the conductors of the second member than the second conductors.

When the first conductors have a greater surface area than the second conductors, the first conductors can be used to transfer power, and the second conductors can be used to send a signal that the first conductors are in the right position. One member is not moved in relation to the other member until there is a need for a transfer of power to the electrical component.

Thus, contact between the first conductors of the first member and the conductors of the second member is not initiated until it is confirmed that the second conductors of the first member are in the right position. When the surface areas of the second conductors are smaller, although large enough to send signals about the position of the safety device, the first conductors can be positioned out of contact until power is needed in the next electrical component. In this way, too much power transferred to the safety device cannot unintentionally be transferred to the next electrical component.

In one embodiment, the surface area may be a contact area in which contact with another conductor is possible.

Moreover, the second conductors may verify if the first conductors are in or out of electrical contact with the conductors of the second member.

Also, the first conductors may be electrically connected in a first electric circuit and the second conductors may be electrically connected in a second electric circuit.

In addition, the moving device may be an electrical motor.

Further, a shaft may be connecting the first and the second member.

Said moving device may be arranged in connection with the shaft either inside the first or second member or outside the first and the second members.

In an embodiment of the invention, the conductors of the second member may have a surface area which is substantially the same as or larger than that of the first conductors of the first member.

Moreover, the surface area of the first conductor may be at least 1.5 times the area of the second conductor, preferably at least 2 times the area of the second conductor.

In addition, the surface area of the first conductor may have a contact area of at least 20 mm$^2$, preferably at least 25 mm$^2$ and more preferably at least 30 mm$^2$.

Furthermore, the surface area of the second conductor may have a contact area of less than 50% of a contact area of the first conductor, preferably less than 30% of the contact area of the first conductor, and more preferably less than 15% of the contact area of the first conductor.

In an embodiment, the safety device may have a first and a second position, and in the first position, the first conductors of the first member are out of contact with the conductors of the second member, and the second conductors in electrical contact with the conductors of the second member, and in a second position, the first conductors of the first member are in contact with the conductors of the second member.

In addition, the safety device may have other positions between the first and the second position.

In another embodiment, the conductors of the first or second member may be coil springs.

Furthermore, the conductors of either the first or the second member may be coil springs, and the conductors of the other member may be conductive rings or conductive bars.

Moreover, the structure may be made of a non-conductive material.

In addition, the first or second member may comprise circumferential or longitudinal grooves for receiving the conductors.

Also, the first member may be connected with the second member by means of a threaded connection on a shaft, and when the shaft rotates in relation to the housing, the first member and the second member move axially in relation to each other.

Additionally, either the first or the second member may be a hollow structure and the other member may be a body extending at least partly within that hollow structure.

The safety device as described above may further comprise a housing comprising the first and second members as well as conductive means, such as a cable or cords, to be connected to a power device of the tool in one end of the housing and to an operational unit of the tool, such as a drilling head, a perforation gun or a cementing unit, in another end of the housing The invention furthermore relates to a downhole tool comprising the safety device as described above for controlling the passage of electricity to a perforation unit, a drilling unit or a cementing unit.

Moreover, the invention relates to a method for activating the safety device as described above, the method comprising the steps of:

arranging the first member in a first position in which the first conductors are out of conductive contact with the conductors of the second member, and in which two of the second conductors are in conductive contact with the conductors of the second member, sending a signal to an operational unit through the second conductors and the conductors of the second member, sending a signal from the operational unit through the second conductors and the conductors of the second member, moving the first and second members in relation to each other from the first position to the second position, in which second position the first conductors are in conductive contact with the conductors of the second member and the two other second conductors are in conductive contact with the conductors of the second member, sending a signal to an operational unit through the second conductors and the conductors of the second member, sending a signal from the operational unit through the second conductors and the conductors of the second member, and transferring power to the operational unit.

Finally, the invention relates to another method for activating the safety device as described above, the method comprising the steps of:

arranging the first member in a first position in which the first conductors are out of conductive contact with the conductors of the second member, and in which two of the second conductors are in conductive contact with the conductors of the second member, sending a signal through the second conductors and the conductors to confirm the first position of the safety device, sending a signal back to confirm the first position of the safety device, moving the first and second members in relation to each other from the first position to the second position, in which second position the first conductors are in conductive contact with the conductors of the second member and the two other second conductors are in conductive contact with the conductors of the second member, sending a signal through the second conductors and the conductors to confirm the second position of the safety device, sending a signal back confirming the second position of the safety device, and transferring power to the operational unit.

BRIEF DESCRIPTION OF THE DRAWINGS

The invention and its many advantages will be described in more detail below with reference to the accompanying schematic drawings, which for the purpose of illustration show some non-limiting embodiments and in which.

All these figures are highly schematic and not necessarily to scale, and they show only those parts which are necessary in order to elucidate the invention, other parts being omitted or merely suggested.

DETAILED DESCRIPTION OF THE INVENTION

The present invention relates to a safety device adapted for delivering electricity to a downhole tool to ensure that an operational unit, such as a drilling head, perforation gun or cementing unit, is not unintentionally activated if an electronic device in the downhole tool breaks down.

Figure 1:
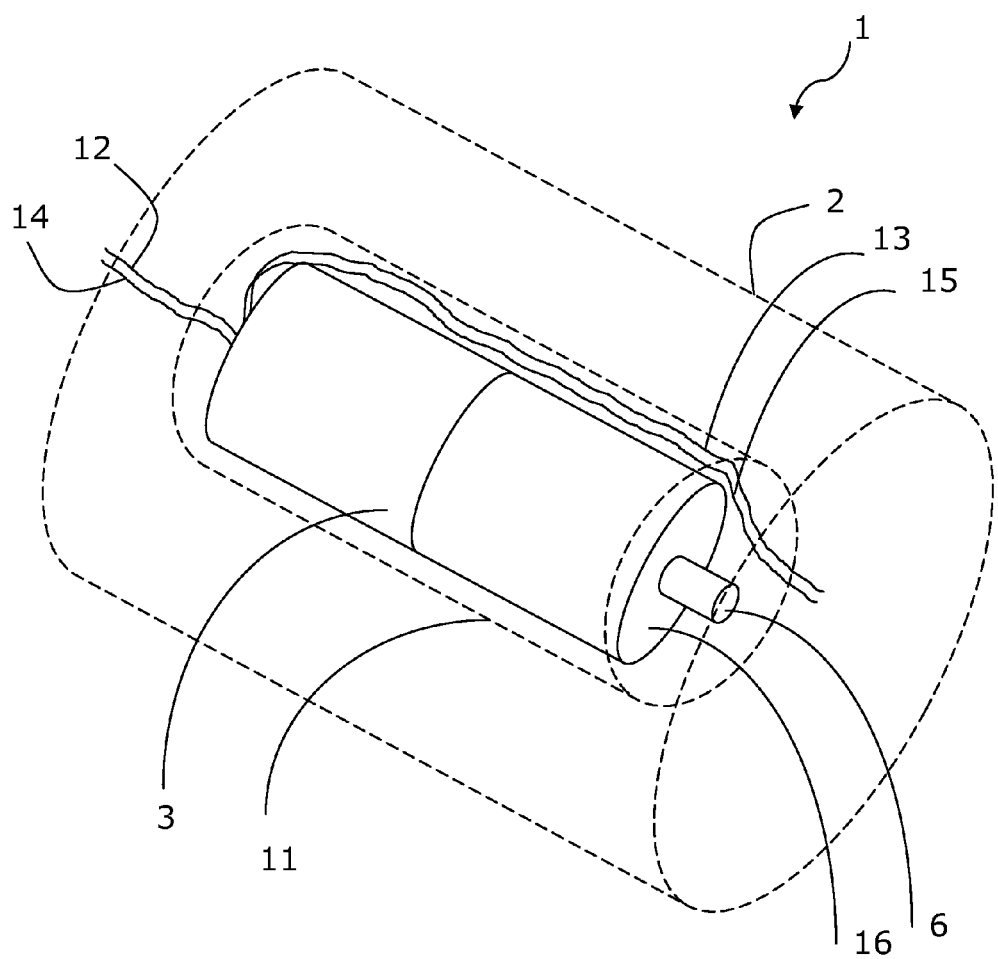
FIG. 1 shows a safety device arranged in a downhole tool.

The downhole tool may comprise several safety devices arranged in series, in parallel or in different positions within the tool, however, in the following description, the tool is described as having only one safety device 1, as shown in FIG. 1. When the tool is connected to a perforation gun, the tool most often has at least two safety devices in series so that a first safety device controls the power delivery to a second safety device which controls the power delivery to a perforation switch or directly to the perforating gun.

At its input side 12, the safety device is connected with a power device (not shown), such as an electrical motor, in the downhole tool by means of conductive means 14, such as cables or cords. At its output side 13, the safety device 1 is electronically connected with the operational unit (not shown), such as a perforation gun, also by means of a conductive means 15.

The safety device 1 comprises a housing 11 in which a first 3 and a second member 6 are arranged together with the conductive means 14, 15. In FIG. 1, the housing 11 and the downhole tool 2 is illustrated by a dotted line.

Figure 2:
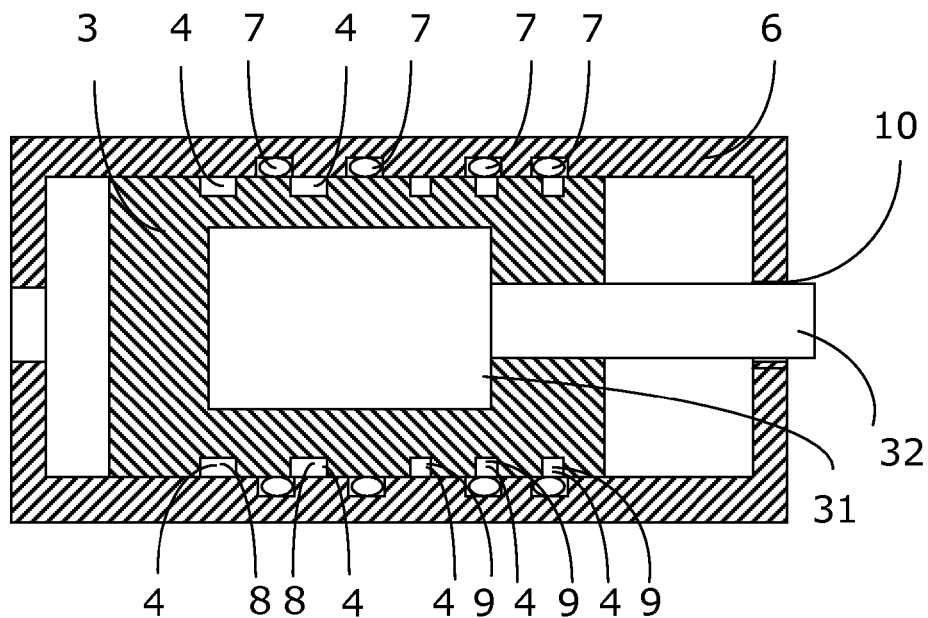
FIG. 2 shows a cross-sectional view of the safety device in an open position.
Figure 4:
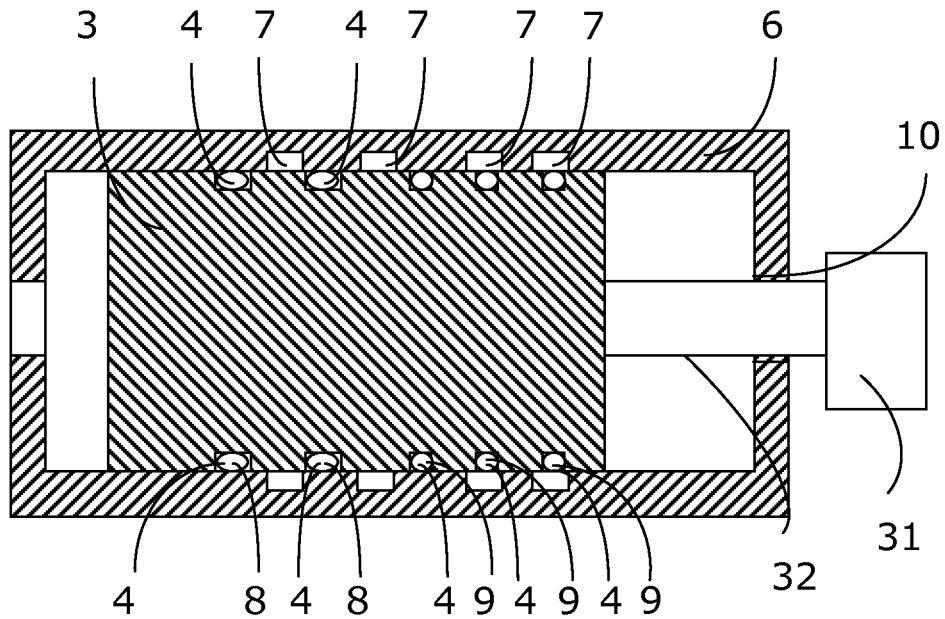
FIG. 4 shows a cross-sectional view of another embodiment of the safety device in an open position.

In FIG. 1, the first member 3 is a hollow structure in which the second member 6 in the form of a body 6 is arranged. In one end 16 of the safety device 1, the body 6 is connected with the hollow structure 3 by means of a threaded connection 10 so that movement of either the hollow structure 3 or the body 6 in relation to the other results in the hollow structure and the body moving axially in relation to each other. In order to move the first member 3 in relation to the second member 6, the safety device 1 comprises a moving device 31 which may be arranged inside the body as shown in FIG. 2 or outside the housing in the end of a shaft 32 as shown in FIG. 4. The moving device 31 may rotate the shaft threadingly connecting the first and second members and thus move the first member in relation to the second member. The moving device 31 may be an electrical motor.

The first 3 and second members 6 comprise a plurality of conductors 4, 7 or contacts. The first member 3 has five conductors 4; two first conductors 8 and three second conductors 9, all in the form of circumferential contact rings. The second member 6 comprises four circumferential grooves comprising four equally sized conductors 7 in the form of conductive coil springs. The first conductors 8 have a greater surface area than the second conductors 9 and are therefore able to transfer more power to the conductors 7 of the second member 6 than the second conductors 9 are. The second conductors 9 are dimensioned to transfer enough power to signal the position of the first 3 and second members 6 in relation to one another within the safety device 1. The first conductors 8 are electrically connected, forming part of a first electric circuit and the second conductors 9 are electrically connected, forming part of a second electric circuit.

In a first position, a first and second of the three second conductors 9 are arranged outside two conductors 7 of the second member 6 of the second electric circuit and the first conductors 8 are out of electrical contact with two other conductors 7 of the second member of the first electric circuit. In order to confirm this first position in which the first conductors 8 are out of electrical contact with two other conductors 7 of the second member of the first circuit and in which it is thus not possible to transfer electric power to an operational tool, the second electric circuit of the two second conductors 9 and the two conductors 7 of the second member 6 is tested to see if the electric circuit is connected. In a second position, the second and third of the three second conductors 9 are arranged outside two conductors 7 of the second member 6 of the second circuit and the first conductors 8 are arranged outside the other two conductors 7 of the second member 6 forming part of the first circuit. In this second position, the first electric circuit is connected and power can be transferred to the operational tool. The second position is confirmed by confirming that the second and third of the three second conductors 9 are electrically connected with the two conductors 7 of the second member forming part of the second circuit. In the first position, electricity cannot be transferred unintentionally to an operational unit even though high power was unintentionally connected due to the fact that the small surface conductors cannot transfer the high power between the first and the second members.

The area in which the first conductors 8 are in conductive contact with the conductors of the second member 6 can be smaller than the surface area of the first conductors, especially if the conductors of one of the members 3, 6 are coil springs.

The conductors 4 of the first member 3 are connected to the power device of the downhole tool 2. The two first conductors are connected with the operational unit of the tool 2, and the three second conductors may be connected to a control device of the tool, able to give signal to move the first 3 and second members 6 in relation to one another. Thus, the three second conductors are not connected to the operational unit as they are only used for determining or verifying the position of the safety device 1.

In FIG. 2, the first conductors 8 are in their first position arranged so that they are not conductively connected to any conductors 7 of the second member 6. In this position, signals can be sent down to the safety device 1 without being passed on to the operational tool. In the event that an electronic device, such as a relay, breaks down and too much power is sent to the safety device 1, the second conductors are unable to transfer that power further on to the operational unit of the downhole tool 2.

Figure 3:
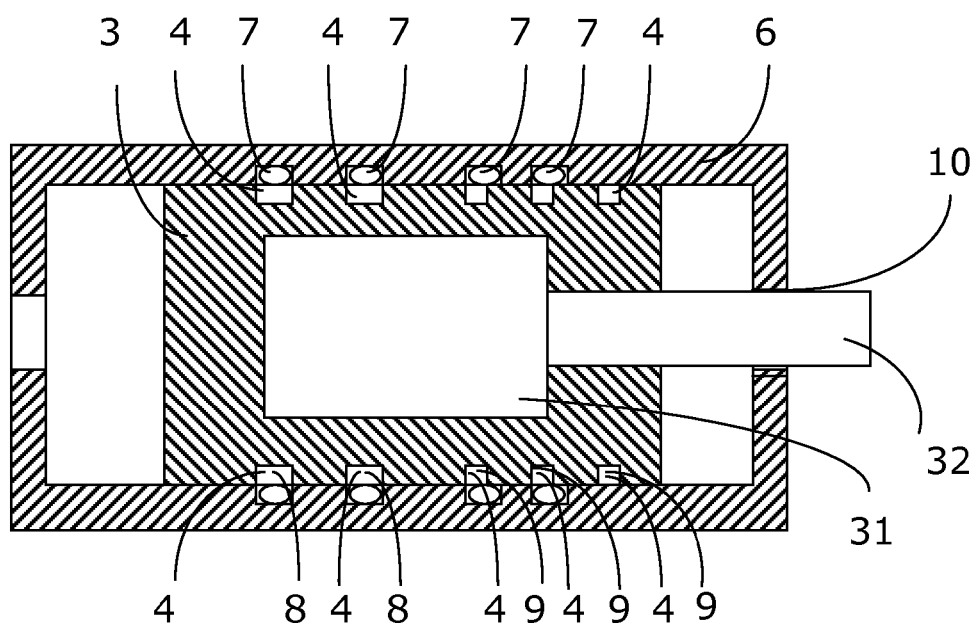
FIG. 3 shows a cross-sectional view of the safety device in a closed position, able to transfer electrical power to an operational unit of the tool.

In FIG. 3, the safety device 1 is shown in its second position in which the first conductors 8 are in contact with two of the four conductors 7 of the second member 6. Two of the three second conductors 9 are now connected with the two other conductors 7 of the second member 6. In this position, the tool 2 can transfer a high amount of power to and from the operational unit through the two first conductors 8.

When the safety device 1 has two positions and two differently sized conductors on one side of the conductive connection, high power cannot unintentionally be transferred to the operational tool. Before entering the well or borehole, the safety device 1 is arranged in its first and open position so that power cannot be transferred to the operational unit. When signals sent to the safety device 1 confirm that the safety device is functional and that the operational unit is in place, the safety device changes its position, and power can now be transferred to the operational tool. In another embodiment, the safety device may have other positions between the first and the second position in which neither the first 8 nor the second 9 conductors of the first member 3 are in contact with the conductors 7 of the second member 6.

In some embodiments, the second conductors 9 are also connected to the operational tool, but since the contact area is not large enough, only signalling power can be transferred to the operational tool. In this way, the condition of the operational unit can be determined or confirmed before transmitting high power to the tool. Even though high power is sent while the safety device 1 is in its first position, the contact area between the first conductors 9 of the first member 3 and the conductors 7 of the second member 6 is not large enough to transmit the power, and the power transmitted to the operational unit is automatically reduced to less than signalling power.

Figure 5:
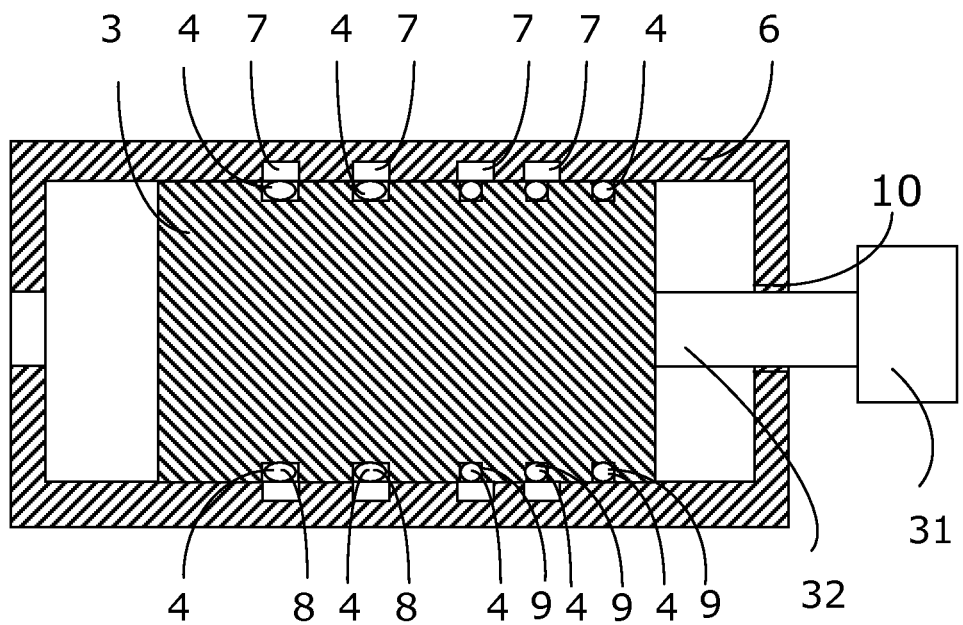
FIG. 5 shows a cross-sectional view of the safety device of FIG. 4 in a closed position, able to transfer electrical power to an operational unit of the tool.

FIGS. 4 and 5 show another embodiment of the safety device 1. The four conductors 7 of the second member 6 are in the form of conductive rings, and the conductors 4 of the first member 3 are coil springs.

By having coil springs or Bal seals (sold by Bal Seal Engineering) on one side of the conductive connection, the elastic spring is able to compensate for a thermal expansion of the first and second members and for inaccuracies in the manufacturing of the first 3 and second members 6 as the elastic spring can be more or less compressed inside the grooves.

Figure 6:
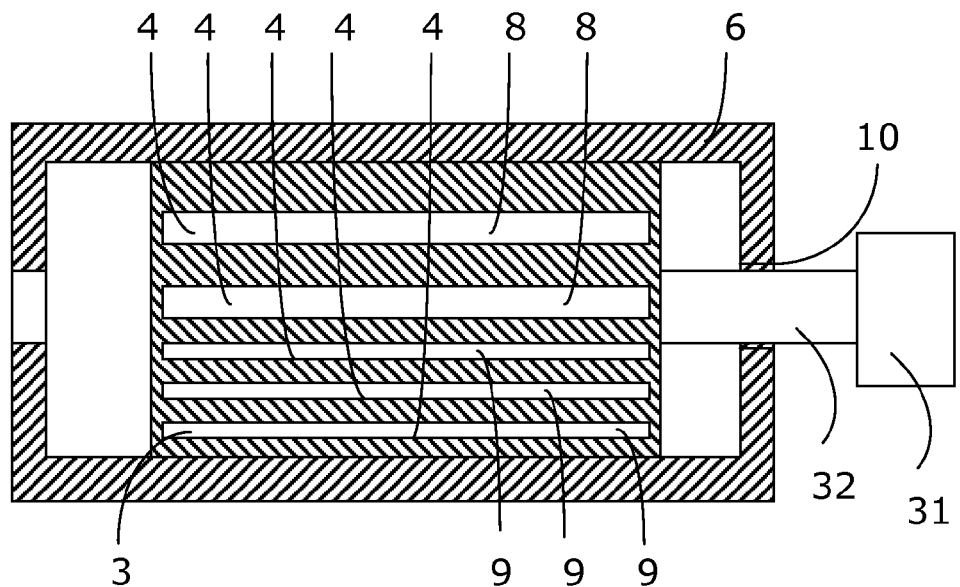
FIG. 6 shows a cross-sectional view of yet another embodiment of the safety device.
Figure 7:
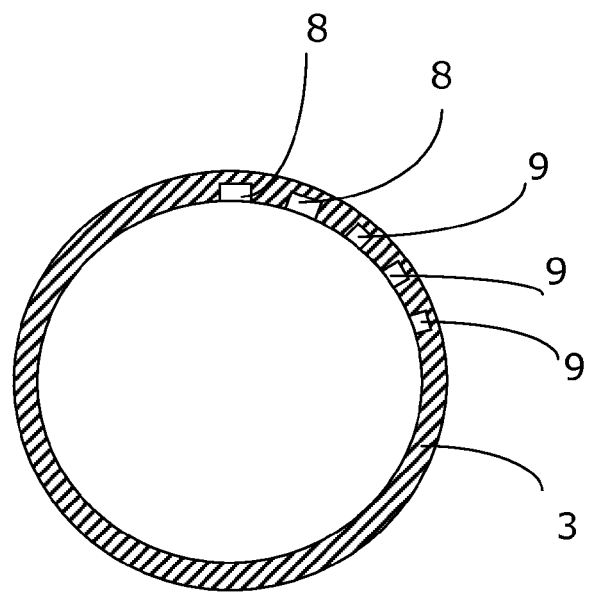
FIG. 7 shows a cross-sectional view of the hollow structure transverse to the view in FIG. 6.

The conductors can also be arranged in axial groves in the first and/or second members, as shown in FIGS. 6 and 7. As shown, the first member 3 comprises two first conductors 8 and three second conductors 9 axially arranged in the form of conductive bars having different widths and thus different circumferential extensions. FIG. 7 shows a cross-sectional view of the safety device transverse to that of FIG. 6, in which conductive bars are also axially arranged so that a rotational movement of the first 3 and/or the second member 6 in relation to one another results in a change of position from a first position to a second position, or vice versa. The safety device 1 may also have a third position in which neither the first 8 nor the second 9 conductors of the first member 3 are in contact with the conductors of the second member 6.

The surface area of the first conductor 8 is at least 1.5 times the surface area of the second conductor 9, preferably at least 2 times the area of the second conductor 9.

In order to transfer power to an operational tool such as a perforation unit, a contact area of the surface area of the first conductor 8 of the first member 3, which is the area in contact with the conductor of the second member 6, is at least 20 mm$^2$, preferably at least 25 mm$^2$, and more preferably at least 30 mm$^2$. When transferring higher power, e.g. during a drilling process, the surface area may have to be increased.

The contact area of the second conductor 9 is less than 50% of a contact area of the first conductor 8, preferably less than 30% of the contact area of the first conductor, and more preferably less than 15% of the contact area of the first conductor.

The first member 3 is shown connected with the second member 6 by means of a threaded connection 10, however, this connection may be any connection suitable for generating a rotational or axial movement of the first 3 and second members 6 in relation to each other.

The first 3 and second members 6 comprise axial or circumferential grooves in which the conductors are arranged. The conductors may also be casted or moulded together with the first 3 and/or the second member 6.

The first 3 and/or the second member 6 is made of a non-conductive material, such as ceramics, plastic, composite, fibre glass or similar material.

Figure 8:
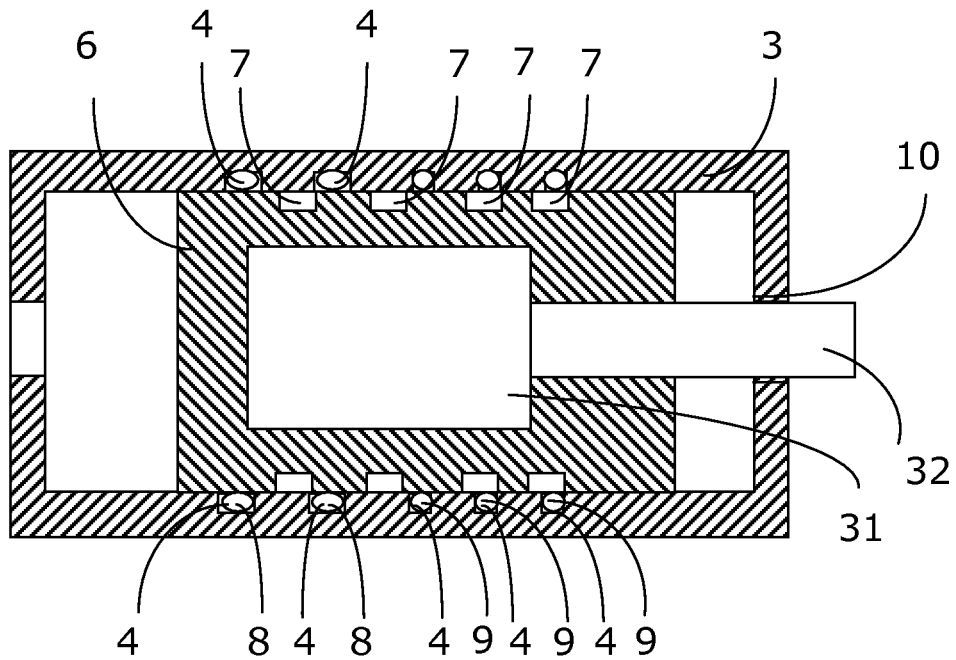
FIG. 8 shows a cross-sectional view of yet another embodiment of the safety device.
Figure 9:
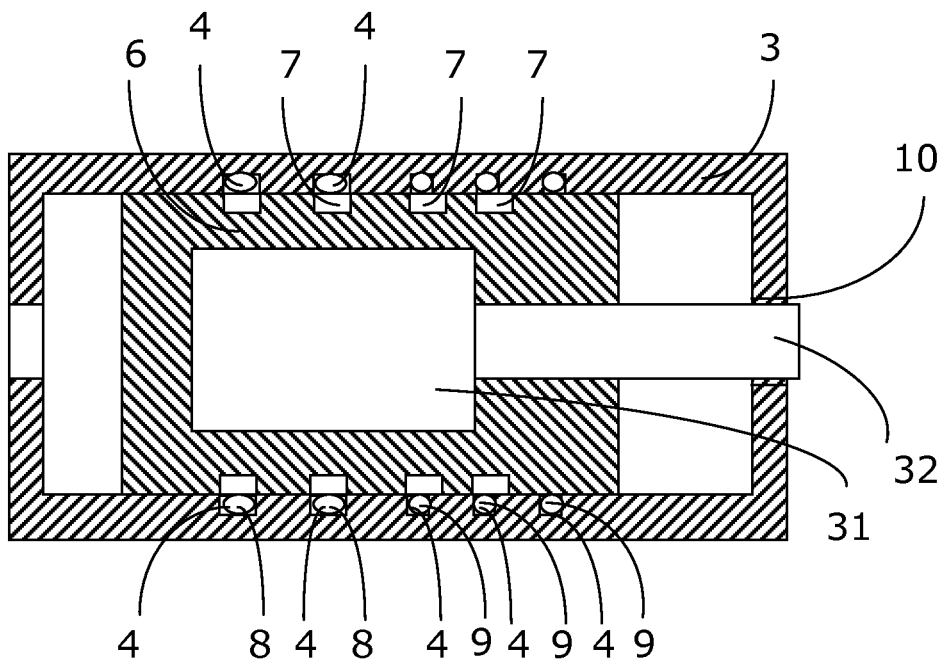
FIG. 9 shows a cross-sectional view of the hollow structure transverse to the view in FIG. 8.

The first member 3 is shown as a solid body and the second member 6 as a hollow structure, which in another embodiment could be vice versa as shown in FIGS. 8 and 9. The first 3 and second members 6 may have any suitable shape, such as a hollow element, a partly hollow element, a frame structure, a solid cylinder or even a square cross-sectional shape if the movement from the first to the second position is only axial.

When activating the safety device 1, the first member 3 is arranged in a first position in which the first conductors 8 are out of conductive contact with the conductors 7 of the second member 6, and in which two of the second conductors 9 are in conductive contact with the conductors 7 of the second member 6. In one embodiment, a signal is sent to an operational unit or a switch through the second conductors 9 and the conductors 7 of the second member 6 to confirm that the tool or switch is functioning, and another signal is sent back as confirmation. When the operational unit is in the right position for performing the operation, the first 3 and second members 6 are moved in relation to each other from the first position to the second position by means of the moving device 31, in which second position the first conductors 8 are in conductive contact with the conductors 7 of the second member 6 and the two of the second conductors 9 are in conductive contact with the conductors 7 of the second member 6 of the second electric circuit. Subsequently, a signal is sent through the second conductors 9 and the conductors 7 of the second member 6 to confirm the second position, and another signal is sent back. Finally, power is transferred to the operational tool.

By contact area is meant the area in which the surface area of the first conductor of one member is in contact with the conductor of the other member.

By a casing is meant all types of pipes, tubings, tubulars, etc. used downhole in relation to oil or natural gas production.

In the event that the tools are not submergible all the way into the casing 4, a downhole tractor can be used to push the tools all the way into position in the well. A downhole tractor is any type of driving tool capable of pushing or pulling tools in a well, such as a Well Tractor®.

Although the invention has been described in the above in connection with preferred embodiments of the invention, it will be evident for a person skilled in the art that several modifications are conceivable without departing from the invention as defined by the following claims.

The invention claimed is:

1. A downhole safety device configured to operate within an underground well bore downhole and configured to control a delivery of electricity from a power device to an electrical component in a downhole tool, comprising:
   a first member arranged within the downhole tool comprising a plurality of electrical conductors;
   a second member arranged within the downhole tool comprising a plurality of electrical conductors; and
   a moving device for moving the first member in relation to the second member within the downhole tool in a first position in which it is not possible to transfer electric power to the electrical component and a second position in which it is possible to transfer electrical power to the electrical component, wherein the electrical conductors of the second member are dimensioned to only allow for data signal transmission in the first and second positions of the first member;
   wherein, in the first position, the first conductors of the first member are out of contact with the conductors of the second member, and the second conductors are in electrical contact with the conductors of the second member, and
   in the second position, the first conductors of the first member are in contact with the conductors of the second member and the conductors of the second member are in contact with the second conductors of the first member,
   wherein the plurality of conductors of the first member comprises first conductors and second conductors, and at least two of the first conductors have a greater surface area than the second conductors, enabling the first conductors to transfer more power to the plurality of conductors of the second member than the second conductors.

2. A downhole safety device according to claim 1, wherein the conductors of the second member have a surface area which is substantially the same as or larger than that of the first conductors of the first member.

3. A downhole safety device according to claim 1, wherein the surface area of the first conductor is at least 1.5 times the area of the second conductor.

4. A downhole safety device according to claim 3, wherein the surface area of the first conductor has a contact area of at least 20 mm$^2$.

5. A downhole safety device according to claim 1, wherein the surface area of the second conductor has a contact area of less than 50% of a contact area of the first conductor.

6. A downhole safety device according to claim 1, wherein the conductors of the first or second member are coil springs.

7. A downhole safety device according to claim 1, wherein the conductors of either the first or the second member are coil springs, and the conductors of the other member are conductive rings or conductive bars.

8. A downhole safety device according to claim 1, wherein the first or second member comprises circumferential or longitudinal grooves for receiving the conductors.

9. A downhole safety device according to claim 1, wherein the first member is connected with the second member by means of a threaded connection on a shaft, and when the shaft rotates in relation to the housing, the first member and the second member move axially in relation to each other.

10. A downhole safety device according to claim 1, wherein either the first or the second member is a hollow structure and the other member is a body extending at least partly within that hollow structure.

11. A downhole safety device according to claim 1, further comprising a housing comprising the first and second members as well as conductive means, such as a cable or cords, to be connected to a power device of the tool in one end of the housing and to an operational unit of the tool, such as a drilling head, a perforation gun or a cementing unit, in another end of the housing.

12. A downhole tool comprising the safety device of claim 1 for controlling the passage of electricity to a perforation unit, a drilling unit or a cementing unit.

13. A method for activating the safety device according to claim 1, the method comprising the steps of:
  arranging the first member in the first position in which the first conductors are out of conductive contact with the conductors of the second member, and in which two of the second conductors are in conductive contact with the conductors of the second member,
  sending a signal to an operational unit through the second conductors and the conductors of the second member,
  sending a signal from the operational unit through the second conductors and the conductors of the second member,
  moving the first and second members in relation to each other from the first position to the second position, in which second position the first conductors are in conductive contact with the conductors of the second member and the two other second conductors are in conductive contact with the conductors of the second member,
  sending a signal to the operational unit through the second conductors and the conductors of the second member,
  sending a signal from the operational unit through the second conductors and the conductors of the second member, and
  transferring power to the operational unit only in the second position.

14. A method for activating the safety device according to claim 1, the method comprising the steps of:
  arranging the first member in the first position in which the first conductors are out of conductive contact with the conductors of the second member, and in which two of the second conductors are in conductive contact with the conductors of the second member,
  sending a signal through the second conductors and the conductors to confirm the first position of the safety device,
  sending a signal back to confirm the first position of the safety device,
  moving the first and second members in relation to each other from the first position to the second position, in which second position the first conductors are in conductive contact with the conductors of the second member and the two other second conductors are in conductive contact with the conductors of the second member,
  sending a signal through the second conductors and the conductors to confirm the second position of the safety device,
  sending a signal back confirming the second position of the safety device, and
  transferring power to the operational unit only in the second position.

\* \* \* \* \*